(12) United States Patent
Lockman, III et al.

(10) Patent No.: US 12,468,575 B2
(45) Date of Patent: Nov. 11, 2025

(54) SYSTEM AND METHOD FOR SCHEDULING RESOURCES OF DISTRIBUTED SYSTEMS TO PERFORM WORKLOADS

(71) Applicant: Dell Products L.P., Round Rock, TX (US)

(72) Inventors: John A. Lockman, III, Granite Shoals, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 431 days.

(21) Appl. No.: 18/307,465

(22) Filed: Apr. 26, 2023

(65) Prior Publication Data

US 2024/0362074 A1    Oct. 31, 2024

(51) Int. Cl.
*G06F 9/50* (2006.01)
*G06F 9/48* (2006.01)

(52) U.S. Cl.
CPC ............ *G06F 9/505* (2013.01); *G06F 9/4881* (2013.01)

(58) Field of Classification Search
CPC ................................ G06F 9/505; G06F 9/4881
See application file for complete search history.

(56) References Cited

U.S. PATENT DOCUMENTS

| | | | | |
|---|---|---|---|---|
| 7,159,221 | B1 * | 1/2007 | Willen | G06F 9/5044 718/104 |
| 11,138,048 | B2 | 10/2021 | Barik et al. | |
| 11,601,497 | B1 * | 3/2023 | Abhigyan | H04L 67/1031 |
| 2015/0012658 | A1 * | 1/2015 | Elmore | H04L 67/565 709/226 |
| 2022/0179700 | A1 * | 6/2022 | Jreij | G06F 9/5038 |
| 2023/0034835 | A1 * | 2/2023 | Reyes | G06F 9/5027 |

OTHER PUBLICATIONS

"PERF05-BP01 Understand how networkingimpacts performance," Amazon Web Services, Web Page <https://docs.aws.amazon.com/wellarchitected/latest/performance-efficiency-pillar/perf_select_network_understand_impact.html> accessed on Jan. 8, 2023 (4 Pages).
"Configure Azure CNI networking in Azure Kubernetes Service (AKS)," Microsoft, Web Page <https://learn.microsoft.com/en-us/azure/aks/configure-azure-cni> accessed on Jan. 8, 2023 (17 Pages).
Hawthorne, Mel, "What Is Work Stealing?" TechniPages, Web Page <https://www.technipages.com/what-is-work-stealing/> accessed on Jan. 8, 2023 (7 Pages).
Gad, Esraa A., "A Work-Stealing for Dynamic Workload Balancing on CPU-GPU Heterogeneous Computing Platforms" (2017) Electronic Theses and Dissertations. 945. (43 Pages).

* cited by examiner

*Primary Examiner* — Prasith Thammavong
(74) *Attorney, Agent, or Firm* — WOMBLE BOND DICKINSON (US) LLP (57) ABSTRACT

Methods and systems for performing workloads are disclosed. The workloads may be distributed across any number of processing elements for performance. The processing elements may be supported by communication elements. The operation of the communication elements may impact the rate at which the processing elements are able to complete the workloads. The operation of the communication elements may be dynamically configured to speed completion of workloads.

20 Claims, 6 Drawing Sheets

SYSTEM AND METHOD FOR SCHEDULING RESOURCES OF DISTRIBUTED SYSTEMS TO PERFORM WORKLOADS

FIELD OF THE DISCLOSED EMBODIMENTS

Embodiments disclosed herein relate generally to workloads. More particularly, embodiments disclosed herein relate to systems and methods for managing workloads performed by distributed systems.

BACKGROUND

Computing devices may provide various computer implemented services by performing corresponding workloads. The computer implemented services may be desired by end users and/or other systems. Different computing devices may perform similar and/or different portions of workloads. The components of the computing devices may have limits on the rate at which workloads may be performed.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing workload performance. To manage workload performance, operation of communication elements that support processing elements that contribute to performance of the workloads may be dynamically updated. The dynamic updates made to the communication elements may speed completion of the workloads, reduce power consumption, and/or provide other types of benefits.

The workloads may be managed using queues in which workload requests are placed. The workload requests may include new requests for workloads reflect all portions of a workload, and revised workload requests that reflect only unassigned portions of a workload. Processing elements may independently draw workload requests from the queue and join workgroups that may perform the workloads.

As workgroups are established and begin to perform workloads, communication elements that support the workloads may monitor the queues and/or workgroups to identify types of workloads and when the workloads will be performed. The communication elements may dynamically reconfigure themselves ahead of workload performance by the workgroups.

By doing so, a data processing system in accordance with embodiments disclosed herein may more efficiently perform workloads by reducing bottlenecking and/or impediments to distributed completion of workloads. Thus, embodiments disclosed herein may, among others, address the technical problem of limited computing resources for performance of workloads. By reducing the impact of communications on distributed performance of workloads, limited computing resources may be more efficiently marshaled for completion of the workloads.

In an embodiment, a method for managing performance of workloads by a distributed system is provided. The method may include identifying, by an element of the distributed system, a workload of the workloads for performance by the distributed system; attempting to establish a workgroup to perform the workload by advertising available portions of the workload using an intent queue; making a determination regarding whether the workgroup has been established within a duration of time from the workload being identified by the element of the distributed system; in a first instance of the determination where the workgroup is established: reconfiguring a portion of communication elements of the distributed system to support a performance of the workload by the workgroup to obtain a reconfigured communication elements, and initiating the performance of the workload by the workgroup using the reconfigured communication elements; in a second instance of the determination where the workgroup is not established: disbanding a prototype workgroup obtained through the attempting to establish the workgroup; and populating the intent queue with a new request for the performance of the workload.

Attempting to establish the workgroup may include identifying a second element of the distributed system that has joined the prototype workgroup; identifying a portion of the workload that the second element is committed to perform; making a second determination regarding whether the prototype workgroup is able to handle the performance of the workload; in a first instance of the second determination where the prototype workgroup is unable to handle the performance of the workload; making a third determination regarding whether the duration of time has elapsed; in a first instance of the third determination where the duration of time has not elapsed: adding a revised workload request to the intent queue, the revised workload request being based, at least in part, on the portion of the workload; in a second instance of the third determination where the duration of time has elapsed: terminating search for additional members for the prototype workgroup.

Advertising the available portions of the workload using the intent queue may include: as members are added to the prototype workgroup, adding new workload requests to the intent queue based on remaining portions of the workload that have not yet been claimed by the members of the prototype workgroup.

New members may be added to the prototype workgroup based on previously added workload requests of the intent queue that have been removed by the members.

Each of the new workload requests may indicate all portions of the workload that are unclaimed.

Reconfiguring the portion of communication elements of the distributed system may include an action selected from a list of actions consisting of: initiating use of a communication protocol; and establishing a private network.

Reconfiguring the portion of communication elements of the distributed system further may include, responsive to completion of the workload, reversing a change in operation of the portion of the communication elements due to action.

In an embodiment, a non-transitory computer readable media is provided. The non-transitory computer readable medium may include instructions that when executed by a processor cause the method to be performed.

In an embodiment, a data processing system is provided. The data processing system may include the non-transitory computer readable media and a processor, and may initiate performance of the method when the computer instructions are executed by the processor.

Figure 1:
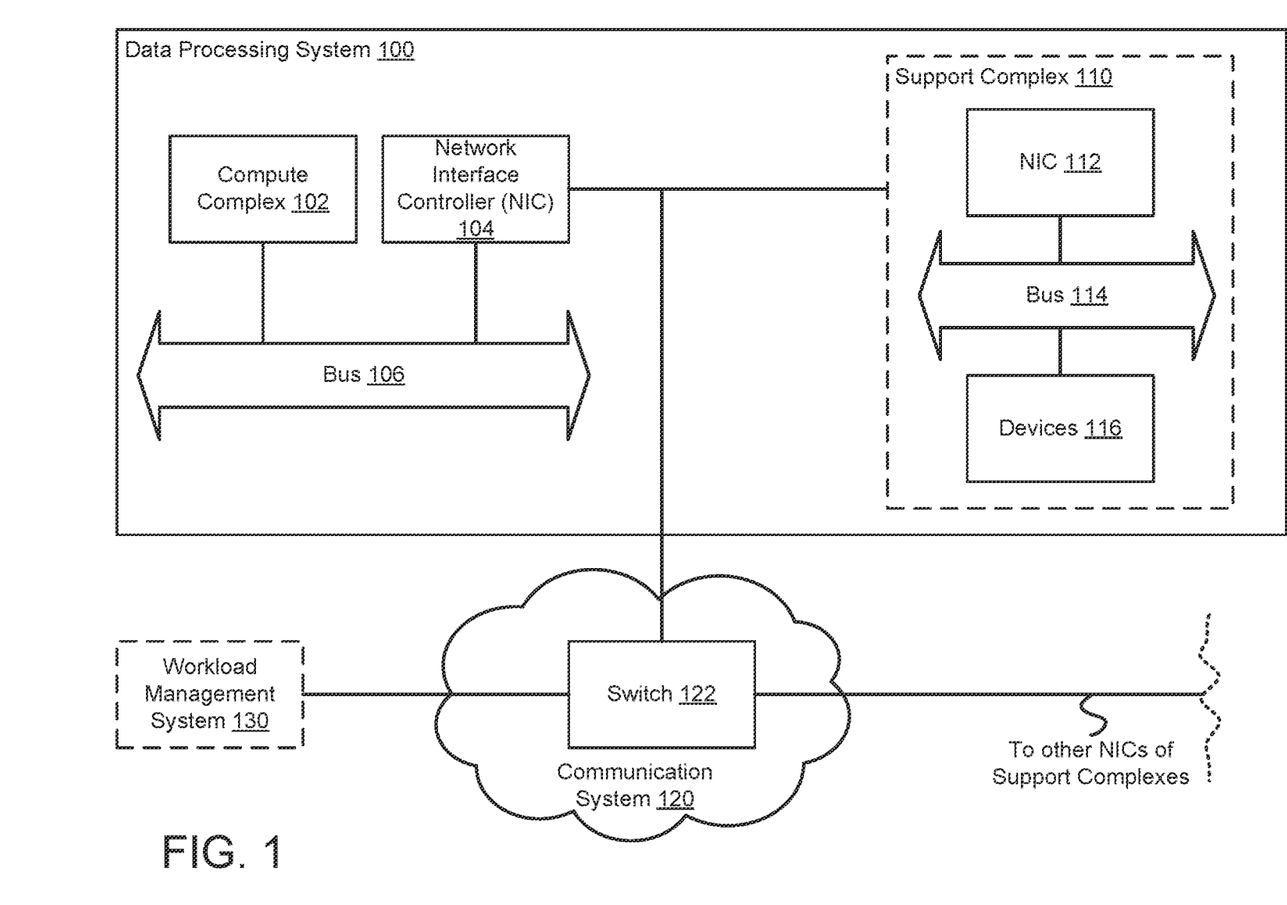
FIG. 1 shows a block diagram illustrating a data processing system in accordance with an embodiment.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include to data processing system 100.

To perform the workloads, data processing system 100 may provide computer implemented services to users and/or other computing devices operably connected to data processing system 100. The computer implemented services may include any type and quantity of services including, for example, database services, instant messaging services, video conferencing services, etc. Different data processing systems may provide similar and/or different computer implemented services.

To provide the computer implemented services, data processing system 100 may include various hardware resources such as compute complex 102, network interface controller (NIC) 104, bus 106, and/or support complex 110. Each of these hardware resources is discussed below.

Compute complex 102 may include hardware devices such as processors, memory modules, etc. These hardware devices may support execution of computer code that causes the computer implemented services to be provided. While providing the computer implemented services, data may be stored in memory (e.g., provided by the memory modules) and/or storage (e.g., non-transitory storage). Compute complex 102 may store data in storage device (e.g., may be one of device 116, may be network attached storage, etc.).

NIC 104 may facilitate communication between compute complex 102 and other devices and/or portions of data processing system. For example, NIC 104 may facilitate communication with support complex 110 and/or other support complex reachable via communication systems (e.g., 120). In doing so, NIC 104 may implement various communication protocols, may selectively allocate its communication resources, etc.

Bus 106 may operably connect compute complex 102, or portions thereof, with NIC 104. Thus, compute complex 102 may communicate with other entities via bus 106.

When providing the computer implemented services, workloads performed by compute complex 102 may utilize limited computing resources (e.g., processing resources, memory resources). Thus, compute complex 102 may only be able to individually perform a certain quantity of workloads. To perform additional workloads, the system of FIG. 1 may cooperatively perform workloads using compute complex 102 of data processing system 100, support complex 110 and/or other support complexes, and/or other compute complexes of other data processing systems.

To facilitate cooperative performance of workloads, NIC 104, NIC 112, switch 122, and/or other communication elements of the system may operably connect the processing elements (e.g., 102, 116, etc.) of the system. Through the operable connections, data usable to coordinate cooperative performance of the workloads and/or to perform distributed processing for the workloads may be exchanged.

However, the manner in which these communication elements operate may impact the performance of the workloads. For example, some workloads may require exchanges of data in different manners (e.g., timing of the exchanges, size of exchanged portions of data, etc.). These different manners of exchange data may be more efficiently served by different communication protocols, by different prioritizations of different types of traffic, etc. Consequently, the manner in which the communication elements operate may cause workloads to be completed more or less quickly.

In general, embodiments disclosed herein relate to systems, methods, and devices for managing performance of workloads cooperatively by different processing elements (e.g., 102, 116) operably connected by communication elements (e.g., 104, 112, 122). The performance of the workloads may be managed by dynamically configuring communication elements that operably connect the processing elements that cooperatively perform the workloads. The communication elements may be dynamically configured based on the workload that will be performed. Consequently, when workloads are performed, the communication elements that support the processing elements performing the workloads may be more likely to provide communication services that speed, rather than slow, completion of the workloads. Once the workloads are completed, the operation of the communication elements may be reverted to a default state.

To manage the workloads performed by the system of FIG. 1, the system of FIG. 1 may implement a workload management framework. The workload management framework may treat each of the processing elements as independent agents which may selectively participate in workloads. New workload to be completed may be added to a queue (e.g., an intent queue). As processing elements become available, the processing elements may join prototype work groups being formed to complete workloads. Once a sufficient number of processing elements has jointed a prototype workgroup, the prototype workgroup may mature to a workgroup which may initiate performance of the workload. During the maturation process, one of the members may be elected as a leader using any consensus based leader election system. The elected leader may manage the process of either maturing the prototype workgroup or disbanding the prototype workgroup. Prior to and/or during performance of the workload, communication elements that support communications between members of the workgroup may be automatically configured to conform provided communication services to speed completion of the workload by the workgroup.

To automatically configure the communication services provided by communication elements of the system, the communication elements may host agents that monitor the queue to identify formation of prototype workgroups and maturation of the prototype workgroups. For example, the communication elements that support corresponding processing elements through communication services may logically attach themselves to prototype workgroups. The communication elements that are logically attached to a prototype workgroup may automatically configure themselves based on the workload (e.g., type) when the prototype workgroup matures and begins performance of the workload.

To provide the above noted functionality, the system of FIG. 1 may include data processing system 100, any number of other data processing systems similar to data processing system 100, communication system 120, and/or workload management system 130. Each of these components is discussed below.

Data processing system 100 may, as noted above, perform workloads that provide computer implemented services. To do so, data processing system 100 may include compute complex 102 and any number of support complexes.

Compute complex 102 may host agents and other entities (applications, frameworks, etc.) that perform various processing through which workloads are completed. For example, compute complex 102 may, to implement the workload management framework, host an agent that (i) identifies when compute complex 102 has available computing resources to contribute to workloads, (ii) joins prototype workgroups based on the available computing resources, (iii) participates in leadership resolution processes for the prototype workgroups, (iv) when elected as a leader of a prototype workgroup, manages either maturation of the prototype workgroup or disbanding of the prototype workgroup depending on whether criteria for performance of a workload is met within limits placed on the maturation process, and/or (v) cooperatively perform workloads as part of workgroups (e.g., matured workgroups) of which compute complex 102 is a member.

To cooperatively perform the workloads, compute complex 102 may perform any number and types of actions. The actions may be selected based on distribute frameworks used to complete the cooperatively perform the workloads.

Compute complex 102 may be implemented using hardware components including, for example, processors, memory modules, etc. These hardware components may be operably connected to NIC 104 via bus 106.

NIC 104 may provide communication services for compute complex 102 that dynamically change as compute complex 102 participates in cooperative performance of various workloads. For example, NIC 104 may, to implement the workload management framework, host an agent that (i) identifies when compute complex 102 joins prototype workgroups through queue monitoring, (ii) monitors the prototype workgroups for maturation, and/or (iii) automatically updates how communication services are provided by NIC 104 based on the workgroups (e.g., matured workgroups) which compute complex 102 is a member.

NIC 104 may be implemented with a smart NIC, a data processing unit, and/or other types of communications device which may include processing resources usable to implement agents usable to manage how communication services are provided by NIC 104. NIC 112 may be similar to NIC 104.

Support complex 110 may (i) host agents and other entities (applications, frameworks, etc.) that perform various processing through which workloads are completed and (ii) participate in performance of workloads. For example, support complex 1110 may, to implement the workload management framework, host an agent that (i) identifies when device 116 have available computing resources to contribute to workloads, (ii) joins prototype workgroups based on the available computing resources, (iii) participates in leadership resolution processes for the prototype workgroups, (iv) when elected as a leader of a prototype workgroup, manages either maturation of the prototype workgroup or disbanding of the prototype workgroup depending on whether criteria for performance of a workload is met within limits placed on the maturation process, and/or (v) cooperatively performs workloads as part of workgroups (e.g., matured workgroups) of which support complex 110 is a member.

To contribute to performance of workloads, support complex 110 may include devices 116. Devices 116 may include any number of hardware devices such as general purpose processors and special purpose processor (e.g., graphics processing units, application specific integrated circuits, etc.). Device 116 may perform processing as part of distributed workload performance frameworks to contribute to completion of various workloads. Devices 116 may perform processing that is similar to or different from the processing performed by compute complex 102.

When contributing to workloads in cooperation with compute complexes, the NICs of the compute complex and support complex may present some of devices 116 as bare metal resources to the processors of compute complex 102. For example, the NICs may implement abstraction layers that present any of devices 116 (and/or virtualized devices using devices 116) to complete complex 102 as a bare metal device via communications over bus 106, even while devices 116 are not directly connected to compute complex 102 via bus 106.

Bus 114 may operably connect NIC 112 and devices 116. Busses 106, 114 may be implemented with communications links that may comply with any communication standard. For example, busses 106, 114 may be implemented with one or more communication links that may conform to a communication specification such as the Peripheral Component Interconnect Express (PCIe) specification, or other types of communication standard.

Other support complex reachable via communication system 120 may be similar to support complex 110.

Figure 2A:
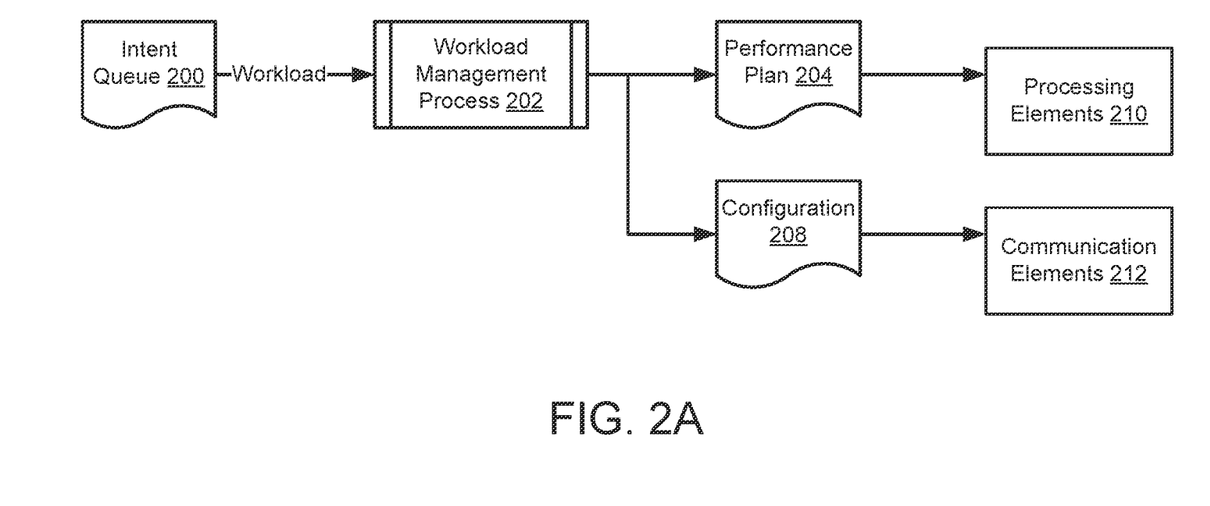
FIGS. 2A-2B show data flow diagrams in accordance with an embodiment.
Figure 2B:
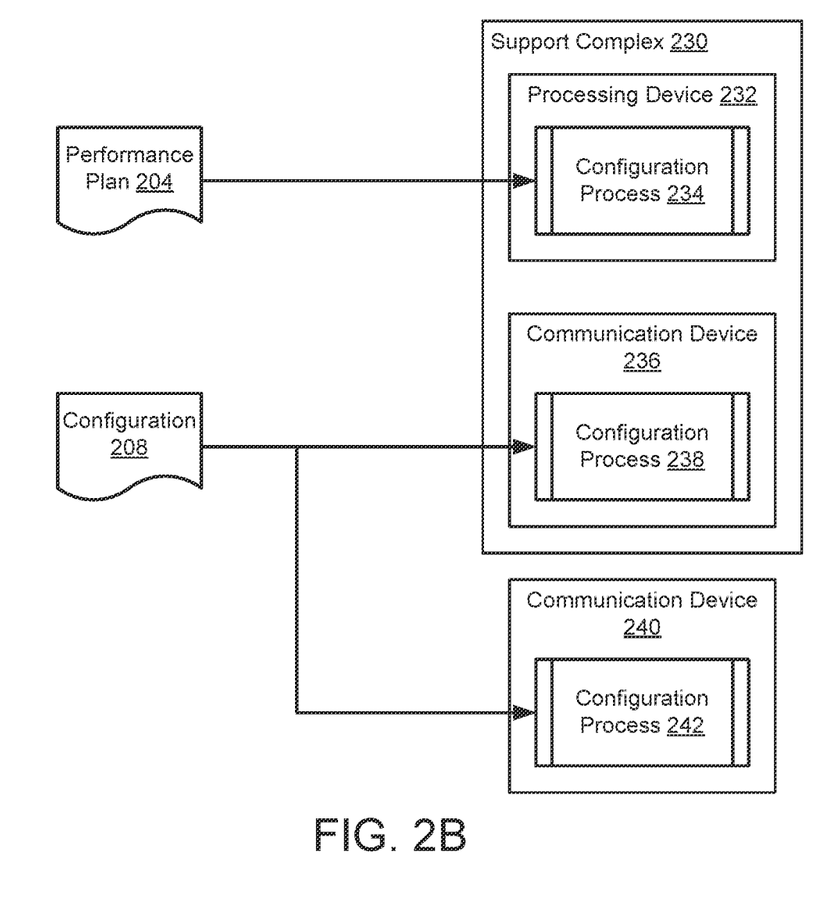

Workload management system 130 may facilitate management of workloads. To do so, workload management system 130 may implement and manage queues (e.g., intent queues) which may be populated with workload requests. The queues may advertise workloads which have been requested to be performed (e.g., by workload requestors, not shown in FIG. 1, which may be any type of entity including, for example, entities hosted by compute complexes). Refer to FIGS. 2A-2B for additional details regarding queues.

While illustrated in FIG. 1 as being a separate entity (e.g., a separate data processing system), it will be appreciated that the functionality of workload management system 130 may be performed by other entities. For example, compute complex 102, support complex 110, and/or other devices may cooperatively implement and manage workload queues.

NICs 104, 112 may be implemented with a hardware devices and/or software components hosted by the hardware devices. In an embodiment, NICs 104, 112 are implemented using a hardware device including circuitry. The hardware device may be, for example, a digital signal processor, a field programmable gate array, system on a chip, or an application specific integrated circuit. The circuitry may be adapted to cause the hardware device to perform the functionality of NICs 104, 112. NICs 104, 112 may be implemented using other types of hardware devices without departing from embodiments disclosed herein.

In an embodiment, NICs 104, 112 are implemented using a processor adapted to execute computing code stored on a persistent storage that when executed by the processor performs the functionality of any of NICs 104, 112 discussed throughout this application. The processor may be a hardware processor including circuitry such as, for example, a central processing unit, a processing core, a part of a system on a chip or other type of special purpose hardware device, or a microcontroller. The processor may be other types of hardware devices for processing information without departing embodiments disclosed herein.

Generally, NICs 104, 112 may include functionality to process network data units such as packets. Packets may be exchanged with communication system 120, and devices operably connected to communication system 120 such as other NICs and/or other entities (not shown). The communications between NICs 104, 112 and other devices may be encapsulated to obtain packets (or other communication protocol compliant data structures), and may traverse through communication system 120.

NICs 104, 112 may be implemented with and/or perform the functions of various types of devices such as data processing units (e.g., portions of a chip or a system on a chip), infrastructure processing units, smart network interface controllers, etc. These devices may generally be programmable, facilitate communications with other components, include accelerator cores or other components for speeding the performance of certain functions such as cryptography, and/or may generally include configurable units to perform a broad array of functions through configuration.

Bus 106 and/or bus 114 may be implemented with one or more communication buses. The communications buses may support various communications standards. In an embodiment, bus 106 and/or bus 114 comprises a Peripheral Component Interconnect Express (PCIE) bus.

In an embodiment, communication system 120 includes one or more networks that facilitate communication between any number of components. The networks may include wired networks and/or wireless networks (e.g., and/or the Internet) supported by any number of communication devices such as switch 122. The networks may operate in accordance with any number and types of communication protocols (e.g., such as the internet protocol). Communication system 120 may perform packetized communication.

To convey information via communication system 120, data structures (e.g., payloads) may be encapsulated (e.g., packetized) with control information compliant with the communication schemes supported by communication system 120. For example, communication system 120 may include the Internet and support internet protocol communications.

Any of the communication devices (e.g., 122) of communication system 120 may be reconfigurable (e.g., to implement different communication protocols, establish different type of network, manage traffic using different schemes, etc.) and may host an agent similar to that hosted by any of NICs 104, 112. Like the NICs, the agents of the communication devices may monitor intent queues and workgroups, and automatically configure themselves so that workloads performed by processing elements serviced by the communication devices are performed more quickly.

Any of compute complex 102, NIC 104, NIC 112, and workload management system 130 may be implemented with a computing device such as a host or server, a personal computer (e.g., desktops, laptops, and tablets), a "thin" client, a personal digital assistant (PDA), a Web enabled appliance, embedded computing device such as a system on a chip, a mobile phone (e.g., Smartphone), and/or any other type of computing device or system. For additional details regarding computing devices, refer to FIG. 4.

While illustrated in FIG. 1 as including a limited number of specific components, a system in accordance with an embodiment may include fewer, additional, and/or different components without departing from embodiments disclosed herein.

As discussed above, processing elements of the system of FIG. 1 may cooperatively perform workloads.

Turning to FIG. 2A, a first data flow diagram in accordance with an embodiment is shown. In FIG. 2A, a first set of shapes (e.g., 200, 204, 208) is used to show data structures, a second set of shapes (e.g., 202) is used to show processes that may be performed, and a third set of shapes (e.g., 210, 212) is used to show components that may use data structures.

To facilitate cooperative performance of workloads, intent queue 200 may store any number of workload requests. The workload requests may indicate workloads to be performed. Intent queue 200 may be populated based on (i) workload requests received from entities that may desire workloads to be performed and (ii) workload requests received from processing elements of the system of FIG. 1.

As processing elements complete workloads and have increased computing resources available, the processing elements may retrieve workload requests from intent queue as part of workload management process 202. When a workload request is retrieved, the processing element may join (or establish a new one if none exist) a prototype workgroup of other processing elements that have committed (at least temporarily) to perform the workload indicated by the retrieved workload requests.

As new members are added to the prototype workgroup, the prototype workgroup may identify whether the members have sufficient available resources to perform the workload. If sufficient resources are available, then performance plan 204 may be established and used to manage performance of the workload. However, if insufficient computing resources are available, then a new workload request may be generated and added to intent queue 200. The new workload request may indicate portions of the originally-requested workload that have not yet been assigned for performance to members of the prototype workgroup. Consequently, when other processing elements pull the new workload request from the queue, the processing elements may join the prototype workload and be assigned to perform some or all of the remaining portions of the workload that have not yet been assigned for performance by members of the prototype workload group.

Performance plan 204 may indicate which portions of the workload are assigned to corresponding processing elements for performance. Once performance plan 204 is established, the prototype workgroup may mature into a workgroup which will perform the workload. For example, copies of performance plan 204 may be distributed to processing elements 210 that are members of the workgroup. Refer to FIG. 2B for additional details regarding cooperative performance of workloads.

Additionally, as workload requests are pulled from intent queue 200, configuration 208 may be established as part of workload management process 202. As processing elements join prototype workgroups, the type of workload to be performed and communication elements that support the members of the prototype workgroups may be used to identify configurations for communication elements to support performance of the workload. The type of the workload may be used to identify, for example, communication protocols, traffic shaping guidelines, and/or other types of configurations for communication elements. For example, the type of the workload may be used as a key to perform a lookup through which corresponding configuration information may be obtained. The content of the lookup table may be populated by a subject matter expert, an automated process, and/or via other methods.

Turning to FIG. 2B, a second data flow diagram in accordance with an embodiment is shown.

Continuing with the discussion from FIG. 2A, once performance plan 204 and configuration 208 are obtained, processing elements such as processing device 232 of support complex 230 may be configured to participate in performance of a workload and communication elements such as communication device 236 and communication device 240 may be configured to support the performance of the workload.

For example, during configuration process 234, applications may be instantiated, data structures may be instantiated, and/or other actions may be performed as indicated by performance plan 204 such that processing device 232 is in condition to participate in performance of a workload.

Similarly, during configuration process 238 and configuration process 242, communication device 236, 240 may be configured based on configuration 208. Communication device 236 may be a NIC of support complex 230 that allows processing device 232 (e.g., a graphics processing unit) to interact with a compute complex and/or other processing devices of other support complexes.

Figure 3A:
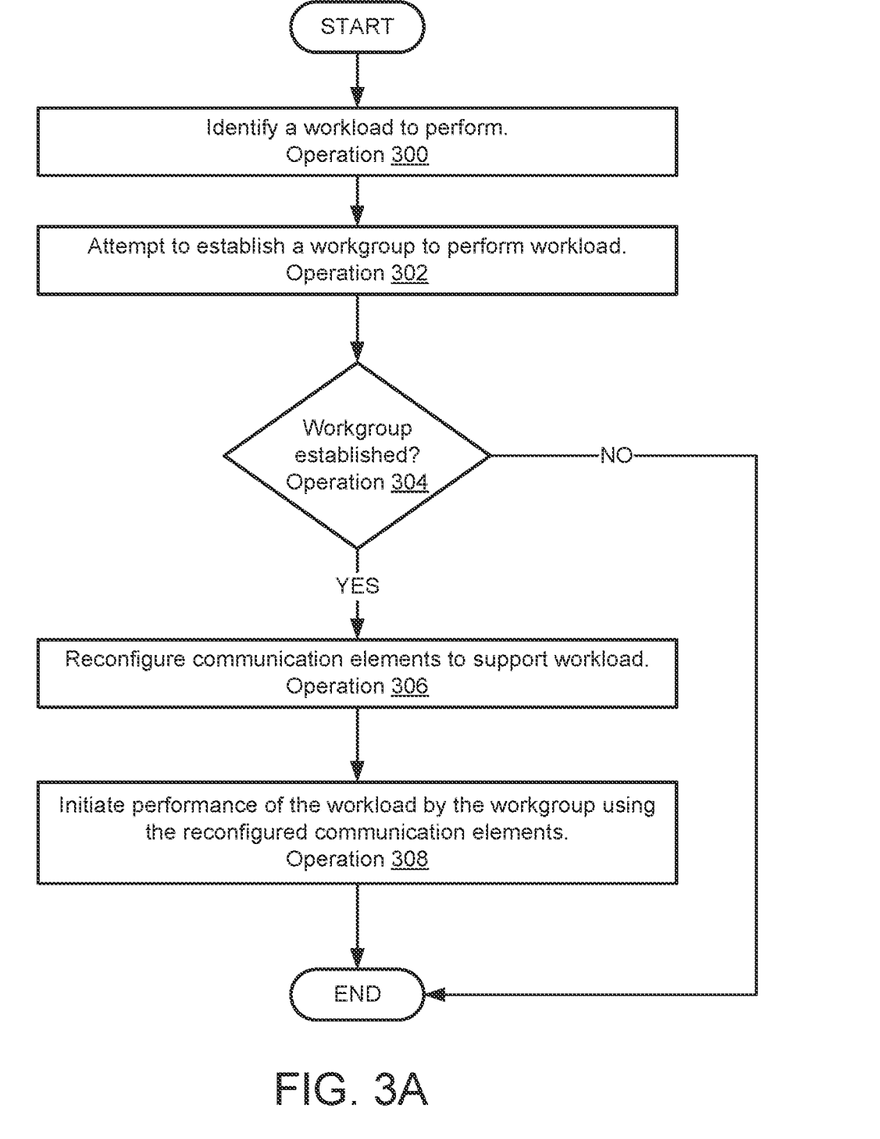
FIGS. 3A-3B show flow diagrams illustrating methods in accordance with an embodiment.
Figure 3B:
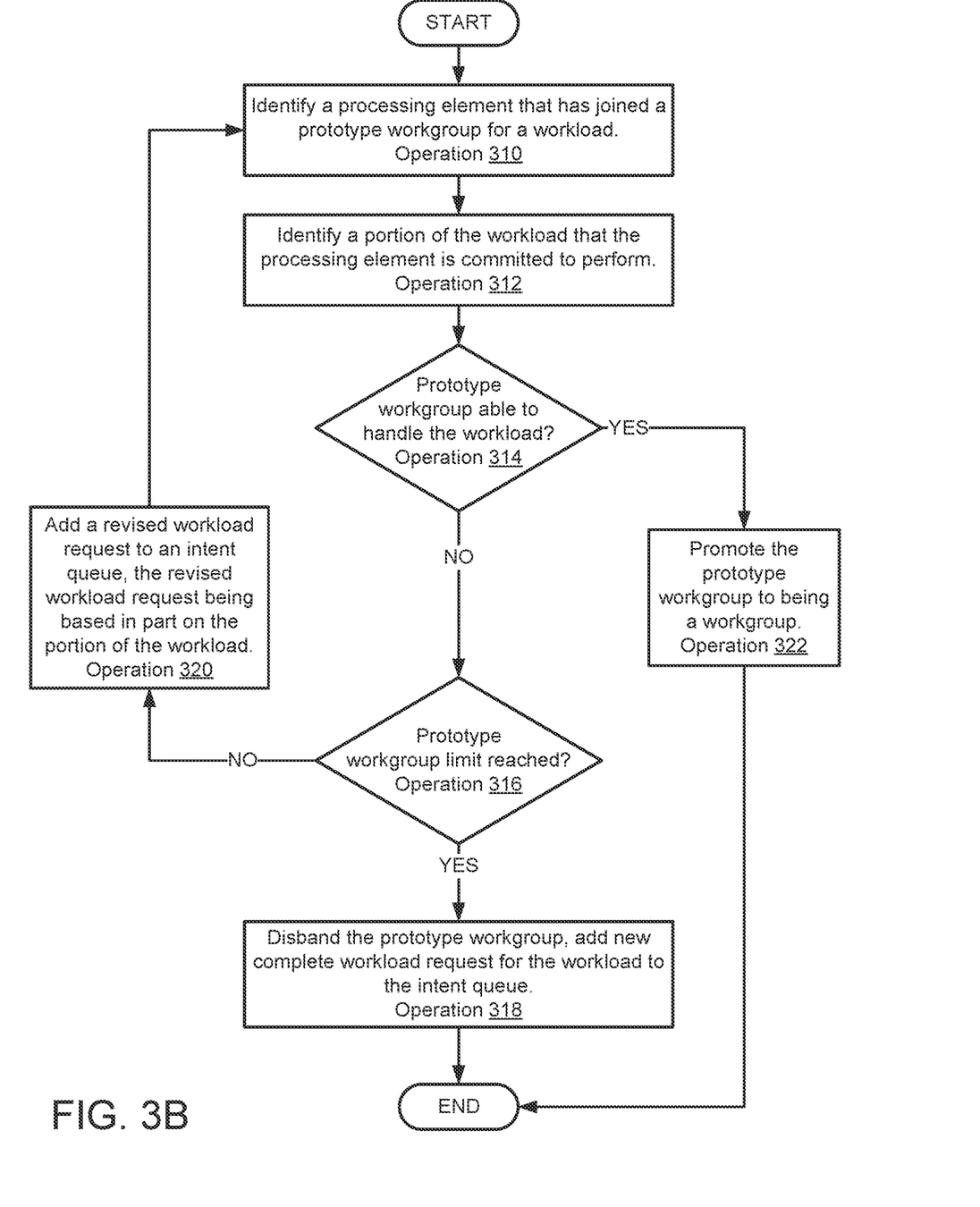

As discussed above, the components of FIG. 1 may perform various methods to perform workloads. FIGS. 3A-3B illustrate examples of methods that may be performed by the components of FIG. 1 when providing their functionalities. In the diagrams discussed below and shown in FIGS. 3A-3B, any of the operations may be repeated, performed in different orders, and/or performed in a parallel with other operations and/or a partially overlapping in time manner with other operations.

Turning to FIG. 3A, a flow diagram illustrating a method of performing workloads in accordance with an embodiment is shown. The method may be performed by a NIC, a data processing system, a compute complex, a support complex, and/or other components of FIG. 1.

At operation 300, a workload to performed is identified. The workload to perform may be identified by retrieving a workload request from an intent queue. Retrieving the workload request may remove the workload request from the queue. The workload request may indicate a workload to perform. The workload request may be retrieved by a processing element.

At operation 302, an attempt to establish a workgroup to perform the workload is performed. The attempt to establish the workgroup may be performed by (i) assigning portions of the workload to processing elements that join a prototype workgroup for the workload, (ii) adding new workload requests to the intent queue for remaining portions of the workload that have not been assigned to members of the prototype workgroup, (iii) maturing the prototype workgroup once all of the portions of the workload have been assigned to members of the prototype workload group, and/or (iv) disbanding the prototype workload group if all of the portions of the workload have not been assigned and a termination criteria has been reached. The termination criteria may be, for example, a duration of time from when the prototype workload group is instantiated.

The prototype workgroup may be instantiated when a first processing element retrieves a workload request from the intent queue and no existing prototype workgroup exists. When a processing element retrieves a workload request, the processing element may either instantiate a new prototype workgroup or join an existing prototype workgroup.

While the prototype workgroup exists, the members of the prototype workgroup may use a consensus based resolution process to identify a leader (i.e., a member of the prototype workgroup). The leader may assign portions of workloads to group members, instantiate new workload requests as portions of the workload are assigned out, mature the workgroup, and/or disband the workgroup.

In the event that the workgroup is disbanded, the leader of the workgroup may add a new workload request for the entire workload to the intent queue. Consequently, other processing elements may retrieve the workload request and attempt to establish a different work group. Former members of the disbanded prototype workgroup may return to the intent queue to obtain new work requests for servicing.

In an embodiment, the attempt to establish the workgroup may be performed via the method shown in FIG. 3B.

At operation 304, a determination is made regarding whether the workgroup is established. The determination may be made based on whether the protype workgroup for the workload matured, or was disbanded. If the prototype workgroup matured, then the workgroup may have been established. If the prototype workgroup was disbanded, then the workgroup may not have been established.

If the workgroup is established, then the method may proceed to operation 306. If the workgroup is not established, the method may end following operation 304. If the workgroup is not established, the prototype workgroup may be disbanded, as noted above, and a new workload request may be added to the intent queue so that other processing elements may attempt to establish a workgroup for the workload.

At operation 306, communication elements may be reconfigured to support the workload. The communication elements may be reconfigured by (i) identifying when prototype workgroups mature into workgroups, (ii) identifying types of workloads that are associated with the workgroups, (iii) identifying a portion of the communication elements that support communications between members of the prototype workgroups, (iv) identifying configurations for the portion of the communication elements based on the types of the workloads, and/or (v) modifying the configuration of the portion of the communication elements based on the identified configurations.

The maturing of the prototype workgroups may be identified by monitoring the intent queue, monitoring membership in prototype workgroups, and/or via other methods. For example, workload requests that are retrieved by processing elements may be identified and used to ascertain membership of prototype workgroups for various workloads. Likewise, when a prototype workgroup matures, the leader or other member of the prototype workgroup may notify the portion of the communication elements that support the members of the prototype workgroup, or the portion of the communication elements may infer that a prototype workgroup has matured (e.g., because no new workload requests are added to the intent queue within a duration of time from when the last workload request for a workload is retrieved).

The configuration for each of the portion of the communication elements may be identified, by for example, by performing a lookup or other processing operation based on the type of the workload, characteristics of the communication elements, and/or other factors. For example, configurations may be associated with various combinations of types of workloads and characteristics (e.g., capabilities) of communication elements by a subject matter expert. The associations may be stored in a table or other data structure thereby allowing for lookups to be performed.

Each communication element of the portion of communication elements may then self-configure themselves based on the identified configurations. The self-configuration process may include, for example, implementing additional communication protocols, establishing private networks, modifying traffic shaping policies, and/or by otherwise modifying the manner in which each communication element processing traffic from devices.

At operation 308, performance of the workload by the workgroup is initiated using the reconfigured communication elements. The performance of the workload may be initiated, for example, by the leader sending out a message or otherwise indicating to the members of the workgroup to begin to perform the workload. Once initiated, the workload may be performed while the communication elements are configured to support the performance of the workload.

The method may end following operation 308.

Turning to FIG. 3B, a flow diagram illustrating a method of attempting to establish a workgroup in accordance with an embodiment is shown. The method may be performed by a NIC, a data processing system, a compute complex, a support complex, and/or other components of FIG. 1.

At operation 310, a processing element that has joined a prototype workgroup for a workload is identified. The identification may be made based on and/or by observing the processing element retrieving a workload request for the workload from an intent queue.

At operation 312, a portion of the workload that the processing element is committed to perform is identified. The portion may be identified by having a leader of the prototype workgroup assign the portion of the workload to the processing element for future performance. The leader may review the computing resources of the processing element that are available for use to identify the extent of the portion of the workload. The leader may then assign the portion of the workload based on the identified extent.

At operation 314, a determination is made regarding whether the prototype workgroup is able to handle the workload. The determination may be made based on whether any of the workload has yet to be assigned to a member of the prototype workgroup. For example, when the portion of the workload is assigned in operation 312, some or none of the workload may yet remain unassigned for future performance. If any remains for assignment, then it may be determined that the prototype workgroup is unable to handle the workload.

If the prototype workgroup is able to handle the workload, then the method may proceed to operation 322. If the prototype workgroup is unable to handle the workload, then the method may proceed to operation 316.

At operation 316, a determination is made regarding whether a prototype workgroup limit has been reached. The determination may be made by evaluating any number of limits for the prototype workgroup. The limits may include, for example, time based limits, operation based limit, limits on the number of members of the prototype workgroup, and/or other types of limits with respect to the existence of the prototype workgroup.

If the prototype workgroup limit is reached, then the method may proceed to operation 318. Otherwise, the method may proceed to operation 320.

At operation 318, the prototype workgroup is disbanded and a new complete workload request for the workload is added to the intent queue. The prototype workgroup may be disbanded by kicking the members from the prototype workgroup. The complete workload request may be added by generating a workload request for all of the workload to the workload queue.

The method may end following operation 318.

Returning to operation 316, the method may proceed to operation 320 when no prototype workgroup limits are reached.

At operation 320, a revised workload request is added to the intent queue. The revised workload request may be based at least in part on the portion of the workload. For example, the revised workload request may be a request for performance of all of the portions of the workload that are not assigned to any member of the prototype workgroup. The revised workload request may be added by generating it and placing it in the intent queue.

By adding the revised workload request to the intent queue, other processing elements may join the prototype workload (e.g., at operation 310).

Returning to operation 314, the method may proceed to operation 322 when the prototype workgroup is able to handle the workload.

At operation 322, the prototype workgroup is promoted to being the workgroup. In other words, when all of the portions of the workload are assigned to members of the prototype workgroup, the prototype workgroup may no longer be a prototype. Rather, the members of the prototype workgroup may be considered to be a workgroup.

The method may end following operation 322.

Using the methods illustrated in FIGS. 3A-3B, embodiments disclosed herein may facilitate performance of workloads in a manner that more efficiently utilized limited computing resources. By dynamically modifying configurations of communication elements that support the operation of processing elements that perform the workload, the performance of the workload may be less likely to be bottlenecked or otherwise impacted by communication limitations. Once the workload is complete, the configuration of the communication elements may be reverted, returned to a default configuration, and/or otherwise adjusted for other considerations.

Figure 4:
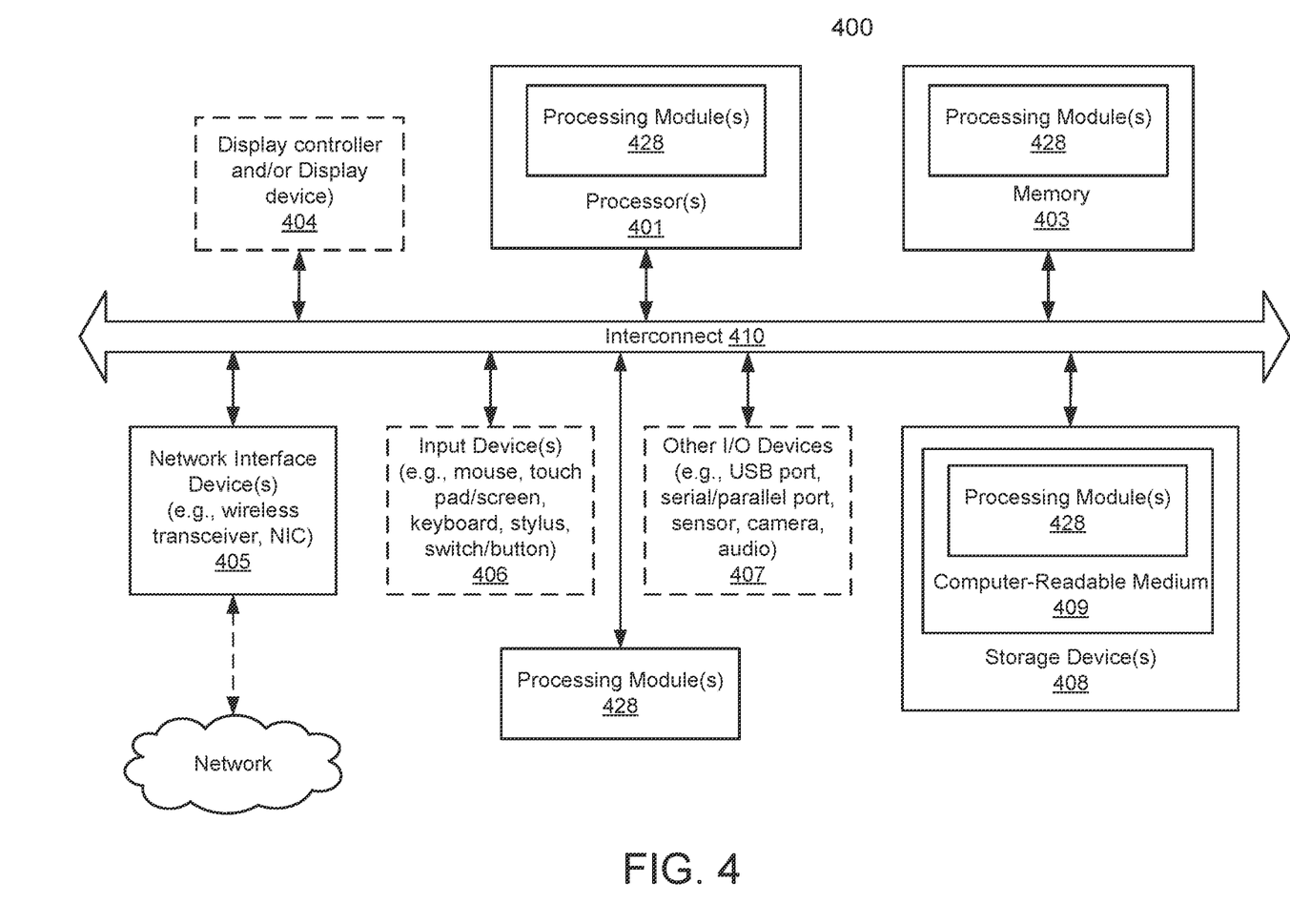
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-408 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing performance of workloads by a distributed system, the method comprising:
    identifying, by an element of the distributed system, a workload of the workloads for performance by the distributed system;
    attempting to establish a workgroup to perform the workload by advertising available portions of the workload using an intent queue;
    making a determination regarding whether the workgroup has been established within a duration of time from the workload being identified by the element of the distributed system;
    in a first instance of the determination where the workgroup is established:
        reconfiguring a portion of communication elements of the distributed system to support a performance of the workload by the workgroup to obtain a reconfigured communication elements, and
        initiating the performance of the workload by the workgroup using the reconfigured communication elements;
    in a second instance of the determination where the workgroup is not established:
        disbanding a prototype workgroup obtained through the attempting to establish the workgroup; and
        populating the intent queue with a new request for the performance of the workload.

2. The method of claim 1, wherein attempting to establish the workgroup comprises:
  identifying a second element of the distributed system that has joined the prototype workgroup;
  identifying a portion of the workload that the second element is committed to perform;
  making a second determination regarding whether the prototype workgroup is able to handle the performance of the workload;
  in a first instance of the second determination where the prototype workgroup is unable to handle the performance of the workload:
    making a third determination regarding whether the duration of time has elapsed;
    in a first instance of the third determination where the duration of time has not elapsed:
      adding a revised workload request to the intent queue, the revised workload request being based, at least in part, on the portion of the workload; and
    in a second instance of the third determination where the duration of time has elapsed:
      terminating search for additional members for the prototype workgroup.

3. The method of claim 1, wherein advertising the available portions of the workload using the intent queue comprises:
  as members are added to the prototype workgroup, adding new workload requests to the intent queue based on remaining portions of the workload that have not yet been claimed by the members of the prototype workgroup.

4. The method of claim 3, wherein new members are added to the prototype workgroup based on previously added workload requests of the intent queue that have been removed by the members.

5. The method of claim 4, wherein each of the new workload requests indicate all portions of the workload that are unclaimed.

6. The method of claim 1, wherein reconfiguring the portion of communication elements of the distributed system comprises an action selected from a list of actions consisting of:
  initiating use of a communication protocol; and
  establishing a private network.

7. The method of claim 1, wherein reconfiguring the portion of communication elements of the distributed system further comprises:
  responsive to completion of the workload, reversing a change in operation of the portion of the communication elements due to action.

8. A non-transitory machine-readable medium having instructions stored therein, which when executed by a processor, cause the processor to perform operations for managing performance of workloads by a distributed system, the operations comprising:
  identifying, by an element of the distributed system, a workload of the workloads for performance by the distributed system;
  attempting to establish a workgroup to perform the workload by advertising available portions of the workload using an intent queue;
  making a determination regarding whether the workgroup has been established within a duration of time from the workload being identified by the element of the distributed system;
  in a first instance of the determination where the workgroup is established:
    reconfiguring a portion of communication elements of the distributed system to support a performance of the workload by the workgroup to obtain a reconfigured communication elements, and
    initiating the performance of the workload by the workgroup using the reconfigured communication elements;
  in a second instance of the determination where the workgroup is not established:
    disbanding a prototype workgroup obtained through the attempting to establish the workgroup; and
    populating the intent queue with a new request for the performance of the workload.

9. The non-transitory machine-readable medium of claim 8, wherein attempting to establish the workgroup comprises:
  identifying a second element of the distributed system that has joined the prototype workgroup;
  identifying a portion of the workload that the second element is committed to perform;
  making a second determination regarding whether the prototype workgroup is able to handle the performance of the workload;
  in a first instance of the second determination where the prototype workgroup is unable to handle the performance of the workload:
    making a third determination regarding whether the duration of time has elapsed;
    in a first instance of the third determination where the duration of time has not elapsed:
      adding a revised workload request to the intent queue, the revised workload request being based, at least in part, on the portion of the workload; and
    in a second instance of the third determination where the duration of time has elapsed:
      terminating search for additional members for the prototype workgroup.

10. The non-transitory machine-readable medium of claim 9, wherein advertising the available portions of the workload using the intent queue comprises:
  as members are added to the prototype workgroup, adding new workload requests to the intent queue based on remaining portions of the workload that have not yet been claimed by the members of the prototype workgroup.

11. The non-transitory machine-readable medium of claim 10, wherein new members are added to the prototype workgroup based on previously added workload requests of the intent queue that have been removed by the members.

12. The non-transitory machine-readable medium of claim 11, wherein each of the new workload requests indicate all portions of the workload that are unclaimed.

13. The non-transitory machine-readable medium of claim 8, wherein reconfiguring the portion of communication elements of the distributed system comprises an action selected from a list of actions consisting of:
  initiating use of a communication protocol; and
  establishing a private network.

14. The non-transitory machine-readable medium of claim 13, wherein reconfiguring the portion of communication elements of the distributed system further comprises:
  responsive to completion of the workload, reversing a change in operation of the portion of the communication elements due to action.

15. A data processing system, comprising:
  a processor, and
  a memory coupled to the processor to store instructions, which when executed by the processor, cause the processor to perform operations for managing performance of workloads by a distributed system, the operations comprising:

identifying, by an element of the distributed system, a workload of the workloads for performance by the distributed system;

attempting to establish a workgroup to perform the workload by advertising available portions of the workload using an intent queue;

making a determination regarding whether the workgroup has been established within a duration of time from the workload being identified by the element of the distributed system;

in a first instance of the determination where the workgroup is established:

initiating reconfiguration of a portion of communication elements of the distributed system to support a performance of the workload by the workgroup to obtain a reconfigured communication elements, and     initiating the performance of the workload by the workgroup using the reconfigured communication elements;

in a second instance of the determination where the workgroup is not established:

disbanding a prototype workgroup obtained through the attempting to establish the workgroup; and     populating the intent queue with a new request for the performance of the workload.

16. The data processing system of claim 15, wherein attempting to establish the workgroup comprises:

identifying a second element of the distributed system that has joined the prototype workgroup;

identifying a portion of the workload that the second element is committed to perform;

making a second determination regarding whether the prototype workgroup is able to handle the performance of the workload;

in a first instance of the second determination where the prototype workgroup is unable to handle the performance of the workload;

making a third determination regarding whether the duration of time has elapsed;

in a first instance of the third determination where the duration of time has not elapsed:

adding a revised workload request to the intent queue, the revised workload request being based, at least in part, on the portion of the workload; and in a second instance of the third determination where the duration of time has elapsed:

terminating search for additional members for the prototype workgroup.

17. The data processing system of claim 16, wherein advertising the available portions of the workload using the intent queue comprises:

as members are added to the prototype workgroup, adding new workload requests to the intent queue based on remaining portions of the workload that have not yet been claimed by the members of the prototype workgroup.

18. The data processing system of claim 17, wherein new members are added to the prototype workgroup based on previously added workload requests of the intent queue that have been removed by the members.

19. The data processing system of claim 18, wherein each of the new workload requests indicate all portions of the workload that are unclaimed.

20. The data processing system of claim 15, wherein reconfiguring the portion of communication elements of the distributed system comprises an action selected from a list of actions consisting of:

initiating use of a communication protocol; and establishing a private network.

* * * * *